United States Patent
Menju et al.

(10) Patent No.: US 8,349,177 B2
(45) Date of Patent: Jan. 8, 2013

(54) SOLID-LIQUID SEPARATOR

(75) Inventors: Takashi Menju, Kanagawa-ken (JP);
Nobuyuki Ashikaga, Kanagawa-ken (JP); Atsushi Yukawa, Tokyo (JP);
Hiromi Tsukui, Tokyo (JP); Hirofumi Noguchi, Kanagawa-ken (JP); Shinji Oono, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/440,388

(22) Filed: Apr. 5, 2012

(65) Prior Publication Data
US 2012/0187040 A1    Jul. 26, 2012

Related U.S. Application Data

(62) Division of application No. 12/203,753, filed on Sep. 3, 2008, now abandoned.

(30) Foreign Application Priority Data

Sep. 3, 2007   (JP) ................................. 2007-227581

(51) Int. Cl.
*C02F 1/24* (2006.01)
*B01D 21/26* (2006.01)

(52) U.S. Cl. ................... 210/221.2; 210/512.1

(58) Field of Classification Search ............... 210/221.2, 210/512.1
See application file for complete search history.

(56) References Cited

U.S. PATENT DOCUMENTS 5,207,920 A    5/1993   Jones

FOREIGN PATENT DOCUMENTS

| CN | 2198038 Y | 5/1995 |
|---|---|---|
| JP | 2000-167432 | 6/2000 |
| JP | 2003-251345 | 9/2003 |
| SU | 973174 | 11/1982 |
| WO | WO-91/01276 A1 | 2/1991 |

OTHER PUBLICATIONS

Notification of the First Office Action issued by the Chinese Patent Office on Jul. 7, 2010, for Chinese Patent Application No. 200810214864.8, and English-language translation thereof.

*Primary Examiner* — Thomas M Lithgow
(74) *Attorney, Agent, or Firm* — Finnegan, Henderson, Farabow, Garrett & Dunner, L.L.P.

(57) ABSTRACT

A solid-liquid separator that separates raw water containing suspended solids into suspended solids (solid) and treated water (liquid) in easy and a short time is provided. A solid-liquid separator includes a separation tub, an inflow pipe configured to rotate raw water which flowed from the outlet of the inflow pipe in the separation tub, a froth discharge pipe configured to discharge the suspended solids surfaced in the separation tub and a treated water discharge pipe configured to discharge treated water by which the suspended solids were removed from raw water from the separation tub.

1 Claim, 11 Drawing Sheets

SOLID-LIQUID SEPARATOR

CROSS REFERENCE TO RELATED APPLICATION APPLICATIONS

This application is a divisional of application Ser. No. 12/203,753, filed Sep. 3, 2008 now abandoned, which is based upon and claims the benefit of priority from Japanese Patent Application No. 2007-227581, filed on Sep. 3, 2007, and the entire contents of both applications are incorporated herein by reference.

FIELD OF THE INVENTION

This invention relates to a solid-liquid separator used in a water treatment process. More particularly, the invention relates to a solid-liquid separator which separates raw water containing suspended solids into solids and a liquid.

As an example of a water treatment process, a solid-liquid separation process, such as gravity sedimentation, coagulation-sedimentation, dissolved air flotation, etc. is used.

Gravity sedimentation and coagulation-sedimentation separate suspended solids and treated water from raw water using a difference between specific gravities of the suspended solids contained in raw water and water. After raw water flows into a sedimentation tub and the suspended solids with a larger specific gravity than a specific gravity of water precipitate, a supernatant liquid is treated as treated water. In this cast, a sedimentation rate changes with the specific gravity of suspended solids or a grain size.

In case of suspended solids with a slow sedimentation rate, processing speed may be improved by increasing sedimentation efficiency by enlarging a capacity of a sedimentation tub or using an inclination pipe or an inclination board. Even if thus sedimentation efficiency is improved, staying time of 1 hour or more is still required, and there is a limit in reduction in staying time. And it is a problem that the capacity of the sedimentation tub is large.

Moreover, the dissolved air flotation is used when the suspended solids which has surfacing property like a solid substance with small specific gravity, or fats and oils. In the dissolved air flotation, the air is dissolved into circulating water of separation liquid etc. by pressure dissolution and the circulating water is made to flow into a separation tub. Generated fine air bubbles adhere to the suspended solids and surface the suspended solids. Thereby the suspended solids and treated water are separated from raw water. In this dissolved air flotation, even if ascent rate of the suspended solids, such as solid substance, fats and oils, etc. to which air bubbles are adhered, is quick, it is about 200 mm/min. Therefore, it is a problem that the dissolved air flotation also needs much treating time.

As mentioned above, in order to shorten the processing speed which was the problem in the conventional gravity sedimentation or the dissolved air flotation mentioned above, Japanese Laid-Open Patent Application No. 2003-251345 discloses a method to separate suspended solids. In this method, a flocculant is added to a solid particle of surfacing property, the suspended solids which are targets for separation is made to adhere to this solid particle. The suspended solids are collected in an inner tube of a separation device by a rotational flow, and thereby the suspended solids are separated. Moreover, Japanese Laid-Open Patent Application No, 2000-167432 discloses the technology which separates and removes a solid substance with large specific gravity such as earth and sand etc. by centrifugal force of a rotational flaw.

However, it was inadequate to have separated into the suspended solids (solid) and treated water (liquid) from raw water only using the centrifugal force generated by the rotational flow. That is, the technology shown in Japanese Laid-Open Patent Application No. 2000-167432 corresponds to the treatment on condition of adding the flocculant to raw water. Moreover, the technology shown in Japanese Laid-Open Patent Application No. 2000-167432 does not separate a solid and a liquid, and is related to the separation of earth and sand.

SUMMARY OF THE INVENTION

In view of the above-mentioned problems, it is an object of the invention to provide a solid-liquid separator that separates raw water into suspended solids (solid) and treated water (liquid) in easy and a short time.

A solid-liquid separator includes a separation tub having an outer wall and a bottom, an inflow pipe having an outlet, a froth discharge pipe having an inlet, and a treated water discharge pipe having an inlet. The outlet of the inflow pipe is positioned outside of the center of the separation tub to rotate raw water which flowed in the separation tub from the outlet of the inflow pipe to the separation tub. The inlet of the froth discharge pipe is positioned near a surface of raw water in the separation tub to discharge the suspended solids surfaced in the separation tub. The inlet of treated water discharge pipe is positioned in the separation tub to discharge treated water in which the suspended solids were removed from raw water.

DETAILED DESCRIPTION OF THE INVENTION

Figure 1:
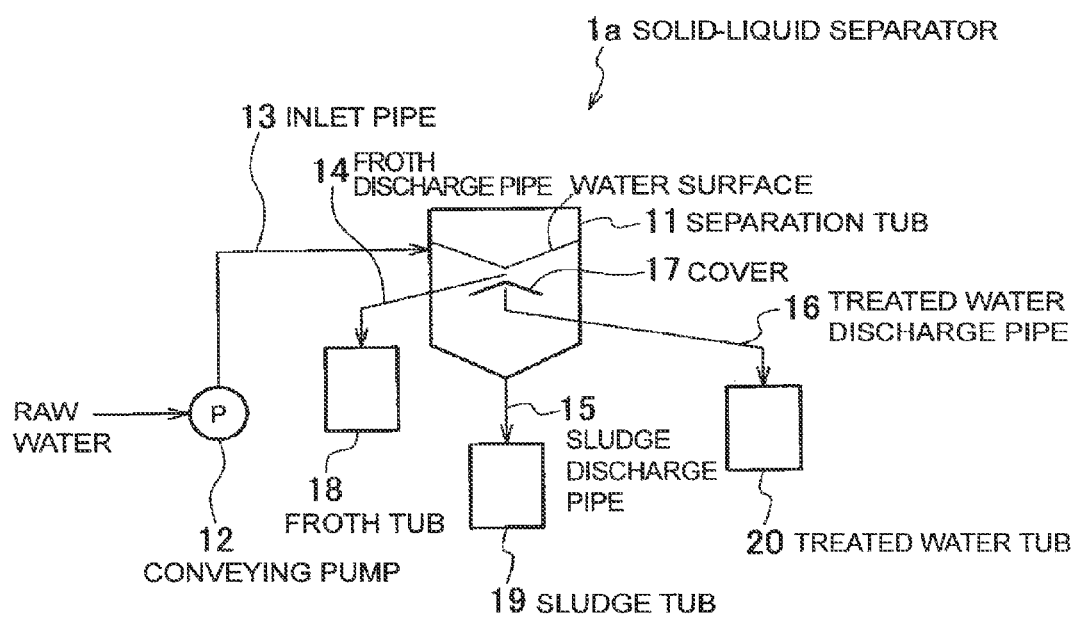
FIG. 1 is a block diagram of a solid-liquid separator according to a first embodiment.

The solid-liquid separator according to the invention is an apparatus used in a water treatment process, and separates raw water containing suspended solids into the suspended solids and treated water. The solid-liquid separators according to the embodiments will be explained in detail with reference to the drawing.

First Embodiment

As shown in FIG. 1, solid-liquid separator 1a according to the first embodiment has separation tub 11, conveying pump 12 which supplies raw water which contains suspended solids M into separation tub 11, and inflow pipe 13 which flows this raw water into separation tub 11. Here, suspended solids M shall contain suspended solids M1 with specific gravity smaller than that of water and suspended solids M2 with larger specific gravity than that of water.

Moreover, solid-liquid-separator 1a is equipped with froth discharge pipe 14, sludge discharge pipe 15 and treated-water discharge pipe 16. Froth discharge pipe 14 discharges suspended solids M1 which surfaced within separation tub 11. Sludge discharge pipe 15 discharges suspended solids M2 which precipitated within separation tub 11. Treated-water discharge pipe 15 discharges treated water in which suspended solids M (M1 and M2) are removed from raw water from separation tub 11. In addition, froth tub 18, sludge tub 19 and treated-water tub 20 are provided in the positions of outlets of froth discharge pipe 14, sludge discharge pipe 15 and treated-water discharge pipe 16, respectively. Moreover, cover hoard 17 of umbrella shape is provided above an inlet of treated-water discharge pipe 16.

Outlet 13a of inflow pipe 13 is provided outside from the center in separation tub 11 so that raw water which flowed into separation tub 11 may rotate in separation tub 11. Separation tub 11, inflow pipe 13 and rotation of raw water which flowed into separation tub 11 from inflow pipe 13 are explained in detail using FIG. 2A and FIG. 2B.

Figure 2A:
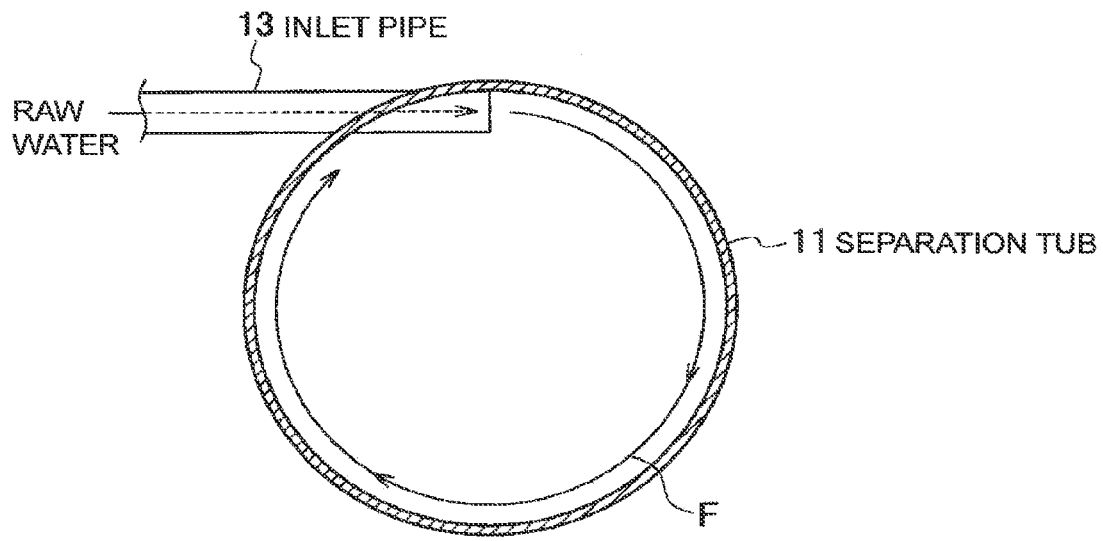
FIG. 2A is a drawing explaining rotation of raw water flowed into the separation tub of the solid-liquid separator shown in FIG. 1.
Figure 2B:
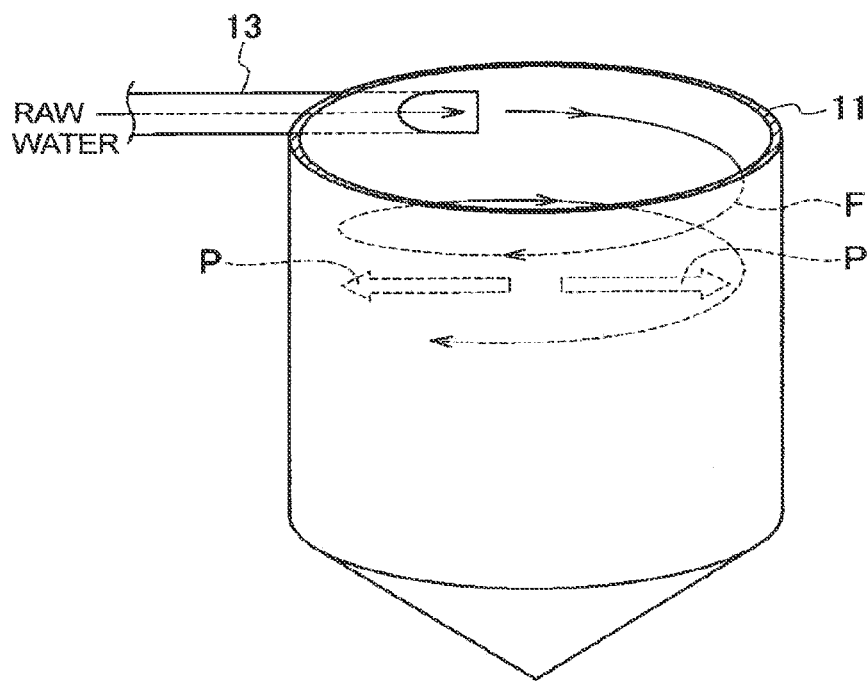
FIG. 2B is a drawing explaining rotation of raw water flowed into the separation tub of the solid-liquid separator shown in FIG. 1.

FIG. 2A is the schematic diagram which looked at the separation tub 11 from the top, and FIG. 2B is the schematic diagram which looked at the separation tub 11 from the side. Separation tub 11 is, for example, the same form as a common liquid cyclone as shown in FIG. 2B. Within separation tub 11, as shown in FIG. 2A and FIG. 2B, raw water which flowed into separation tub 11 from inflow pipe 13 provided on, for example, an inner wall rotates in a direction shown by arrow F. At this time, centrifugal force which works within separation tub 11 faces toward outside.

Figure 3:
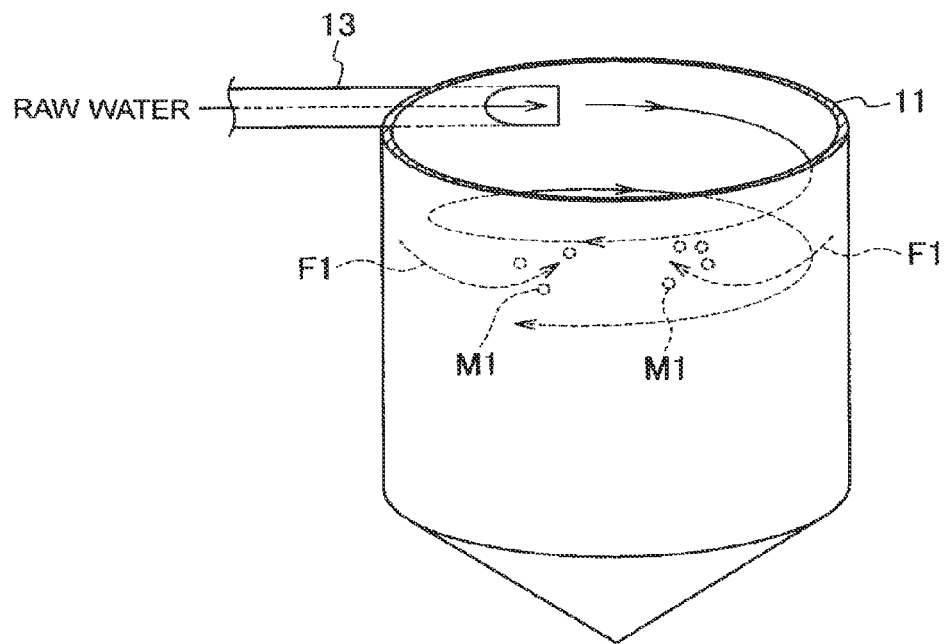
FIG. 3 is a drawing explaining a motion of suspended solids with specific gravity smaller than that of water in the separation tub of the solid-liquid separator shown in FIG. 1.
Figure 4:
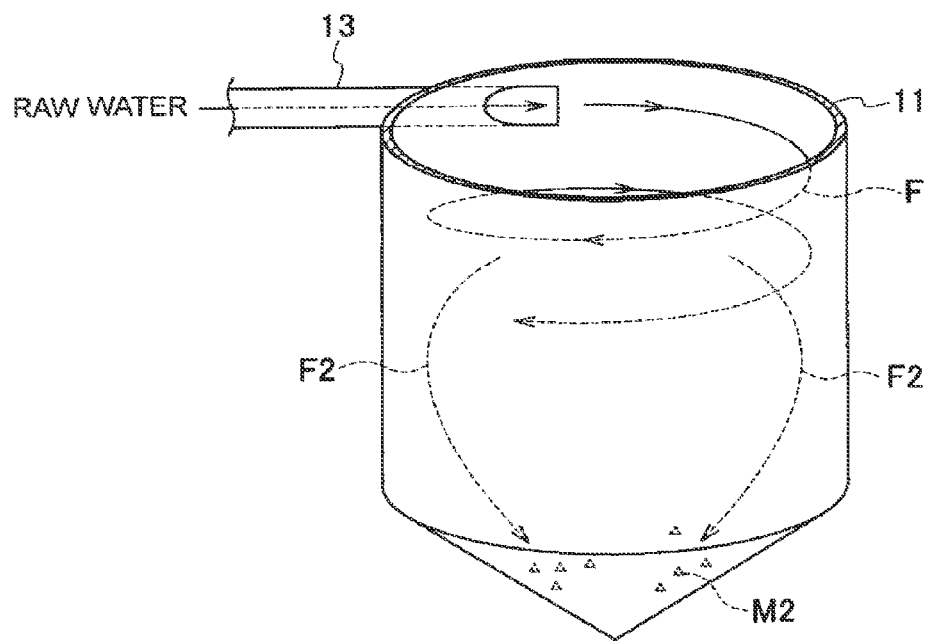
FIG. 4 is a drawing explaining a motion of suspended solids with larger specific gravity than that of water in the separation tub of the solid-liquid separator shown in FIG. 1.

While raw water rotates by flow F in separation tub 11 as shown in FIG. 2A and FIG. 2B, suspended solids M1 with specific gravity smaller than that of water surface, moving towards arrow F1 as shown in FIG. 3. Moreover, suspended solids M2 with specific gravity larger than that of water precipitate, moving towards arrow F2 as shown in FIG. 4. Therefore, according to solid-liquid separator 1a, suspended solids M1 (froth) surfaced are discharged from froth discharge pipe 14, and suspended solids M2 (sludge) precipitated are discharged from sludge discharge pipe 15. Thereby, suspended solids M are separated from raw water.

Froth discharge pipe 14, sludge discharge pipe 15 and treated water discharge pipe 16 will be explained with reference to FIG. 5.

As shown in FIG. 3, if raw water rotates within separation tub 11, suspended solids M1 with specific gravity smaller than that of water contained in raw water will surface, circling. In solid-liquid separator 1a, froth inlet 14a of froth discharge pipe 14 which discharges suspended solids M1 is provided in the height in which suspended solids M1 surfaces when raw water rotates at predetermined speed, while raw water of predetermined quantity flows in separation tub 11. That is, the surface of raw water circling in separation tub 11 is low in the center of separation tub 11, and becomes high gradually from the center to the side of separation tub 11. If the nature of suspended solids M1 is known when the inflow quantity and the revolution speed of raw water are fixed, the position and height in which suspended solids M1 exist within separation tub 11 can be specified. Therefore, in solid-liquid separator 1a, froth inlet 14a of froth discharge pipe 14 is provided in the position beforehand specified by the inflow quantity and the rotation speed of raw water Suspended solids M1 which flowed into froth discharge pipe 14 from froth inlet 14a flow out into froth tub 18 shown in FIG. 1. In addition, froth inlet 14a may have the function in which height can be adjusted up and down in accordance with operation conditions, such as the inflow quantity.

Moreover, if raw water rotates within separation tub 11, as shown in FIG. 4, suspended solids M2 with specific gravity larger than that of water contained in raw water will precipitate, circling. As shown in FIG. 5, separation tub 11 has an outer wall with a cylindrical inside and a bottom where a center is the deepest, and suspended solids M2 precipitate in the center. For this reason, sludge discharge pipe 15 is provided so that sludge inlet 15a may be located in the center of the bottom of separation tub 11. Suspended solids M2 which flowed into sludge discharge pipe 15 from sludge inlet 15a flow out into sludge tub 19 shown in FIG. 1.

If raw water rotates within separation tub 11, as mentioned above, suspended solids M1 with specific gravity smaller than that of water will surface, and suspended solids M2 with specific gravity larger than that of water will precipitate. That is, within separation tub 11, while raw water rotates, raw water will separate into three layers, and suspended solids M1 will exist in an upper layer, suspended solids M2 will exist in a lower layer, and treated water, will exist in a middle layer. Therefore, treated water discharge pipe 16 is installed so that treated-water inlet 16a may be located in the middle layer in separation tub 11, as shown in FIG. 5. Treated water which suspended solids M1 and M2 were removed from raw water and flowed into treated-water discharge pipe 16, flows into treated-water tub 20 shown in FIG. 1. In addition, treated-water discharge pipe 16 may be equipped with a function for adjusting a surface height of raw water in solid-liquid-separator 1a.

Figure 5:
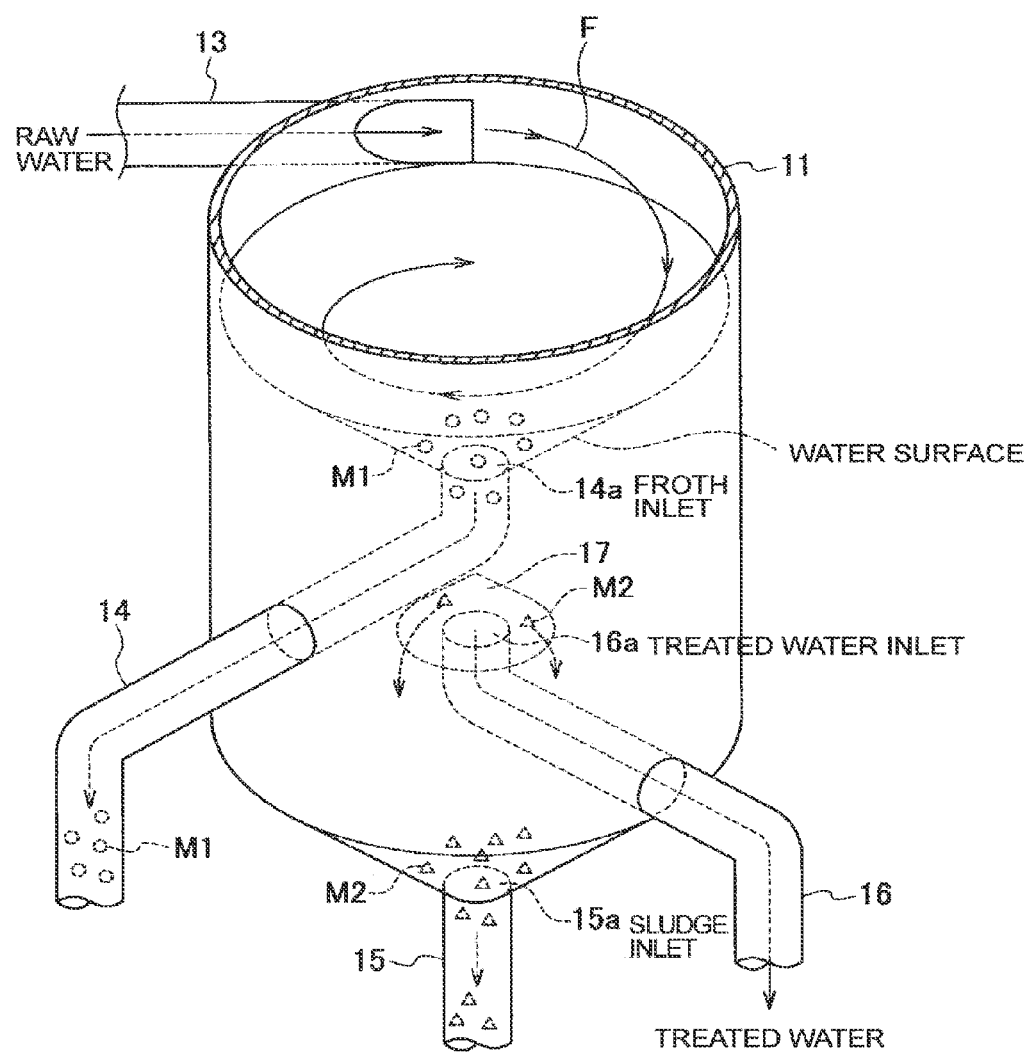
FIG. 5 is a drawing explaining an inside of the separation tub of the solid-liquid separator shown in FIG. 1.

Here, as shown in FIG. 5, even if suspended solids M2 are brought near in the center of the middle layer, cover board 17 of umbrella form provide above treated-water inlet 16a prevents that suspended solids M2 flow into treated-water discharge pipe 16.

As mentioned above, solid-liquid separator 1a according to the first embodiment, separates raw water into solids (suspended solids) and a liquid (treated water) by making raw water rotate in separation tub 11. Therefore, as compared with the conventional gravity sedimentation etc., solid-liquid separation of raw water is performed in easy and a short time, and a capacity required as separation tub 11 can also be reduced. Moreover, in this case, even if the suspended solids are suspended solids M1 with specific gravity smaller than that of water or suspended solids M2 with larger specific gravity than that of water, the suspended solids can be separated from water and can be collected. In addition, in order to promote precipitation of suspended solids M2, a flocculant etc. can be added to raw water.

Second Embodiment

Solid-liquid separator 1b according to the second embodiment is explained with reference to FIG. 6. Unlike solid-liquid separator 1a shown in FIG. 5, solid-liquid separator 1b is equipped with froth collector 22 and sludge collector 23 in separation tub 11. Since other structure is the same as that of solid-liquid separator 1a explained in FIGS. 1 to 5, explanation about other structure is omitted.

Figure 6:
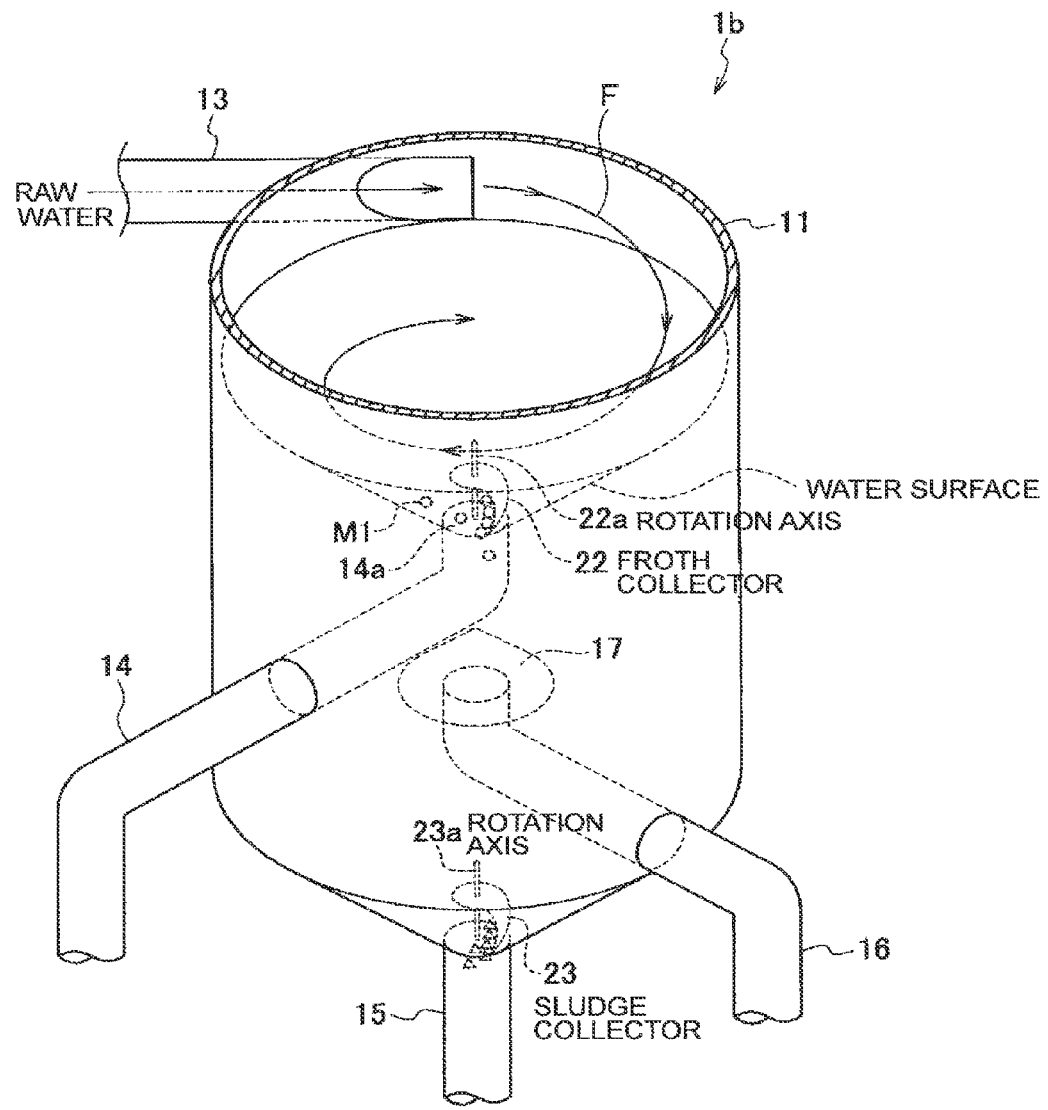
FIG. 6 is a drawing explaining a structure of a solid-liquid separator according to a second embodiment.

As shown in FIG. 6, in separation tub 11 of solid-liquid separator 1b, froth collector 22 is provided above froth inlet 14a. Froth collector 22 collects suspended solids M1 which surfaced around froth inlet 14a, and introduces suspended solids M1 into froth discharge pipe 14. By control of a motor (not shown), froth collector 22 rotates on rotation axis 22a and introduces the collected suspended solids M1 into froth discharge pipe 14.

Sludge collector 23 is provided above sludge inlet 15a. Sludge collector 23 collects suspended solids M2 which precipitated around sludge inlet 15a, and introduces suspended solids M2 into sludge discharge pipe 15. By control of a Motor (not shown), sludge collector 23 rotates on rotation axis 23a and introduces collected suspended solids M2 into sludge discharge pipe 15.

In addition, the size and the form of collectors 22 and 23 are not limited and can be freely set to the size and the form to discharge suspended solids M effectively, according to the property of suspended solids M contained in target raw water for solid-liquid separator 1b. Moreover, solid-liquid separator 1b does not necessarily need both troth collector 22 and sludge collector 23 shown in FIG. 6. Solid-liquid separator 1b can be equipped with only one of collectors 22 and 23 according to the property of suspended solids M contained in raw water for treating.

As mentioned above, according to solid-liquid separator 1b of the second embodiment, by collectors 22 and 23, discharge of suspended solids M can be promoted and processing speed can be shortened further.

Third Embodiment

Figure 7:
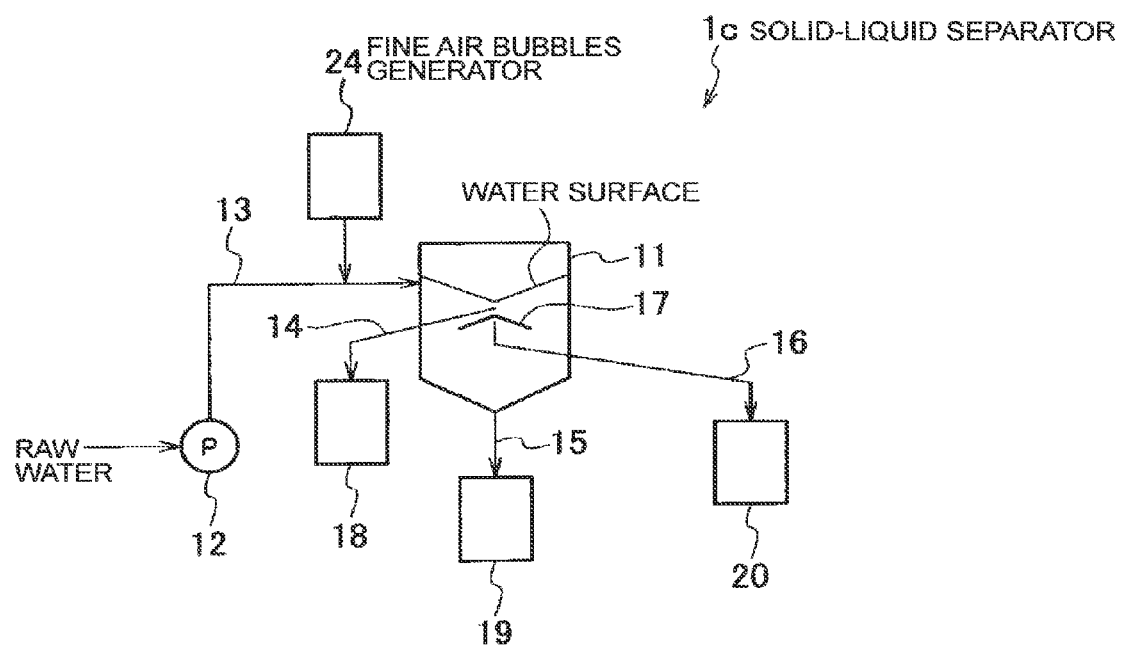
FIG. 7 is a drawing explaining a structure of a solid-liquid separator according to a third embodiment.

As shown in FIG. 7, solid-liquid separator 1c according to the third embodiment differs from solid-liquid separator 1a explained using FIGS. 1 to 5 in that solid-liquid separator 1c has fine air bubbles generator 24.

Fine air bubbles generator 24 generates fine air bubbles, such as micro bubbles or nano bubbles, and supplies the fine air bubbles to raw water which flows into separation tub 11. Although a detailed explanation is omitted about the structure of fine air bubbles generator 24, the fine air bubbles generator which the conventional water treatment apparatus uses can be used. The size of the fine air bubbles is fine size to adhere to the suspended solids, such as a diameter of micron size or nanometer size, etc. Surfacing of suspended solids M1 is promoted because fine air bubbles adhere to suspended solids M1 with specific gravity smaller than that of water.

Here, fine air bubbles generator 24 may generate fine air bubbles with the air, and may generate fine air bubbles by mixed gas of the air and gases other than that of the air. For example, when the fine air bubbles are generated with the mixed gas containing ozone, the effect of oxidation or pasteurization is obtained by ozone. Moreover, when the fine air bubbles are generated with the mixed gas containing carbon dioxide, effect such as pH adjustment. etc. is obtained with carbon dioxide.

As mentioned above, according to solid-liquid separator 1c of the third embodiment, by supplying the fine air bubbles to raw water and making the fine air bubble adhere to suspended solids M1, surfacing of suspended solids M1 can be promoted and shortening of processing time can be obtained. In addition, fine air bubbles generator 24 stay be provided in the middle of inflow pipe 13.

Fourth Embodiment

Solid-liquid separators 1d according to the fourth embodiment is explained with reference to FIG. 8. In solid-liquid separator 1d, stir wings 25 are provided in separation tub 11 of solid-liquid separator 1c according to the third embodiment shown in FIG. 7. Since other structure is the same as that of solid-liquid separator is explained using FIGS. 1 to 5, explanation about other structure is omitted.

Figure 8:
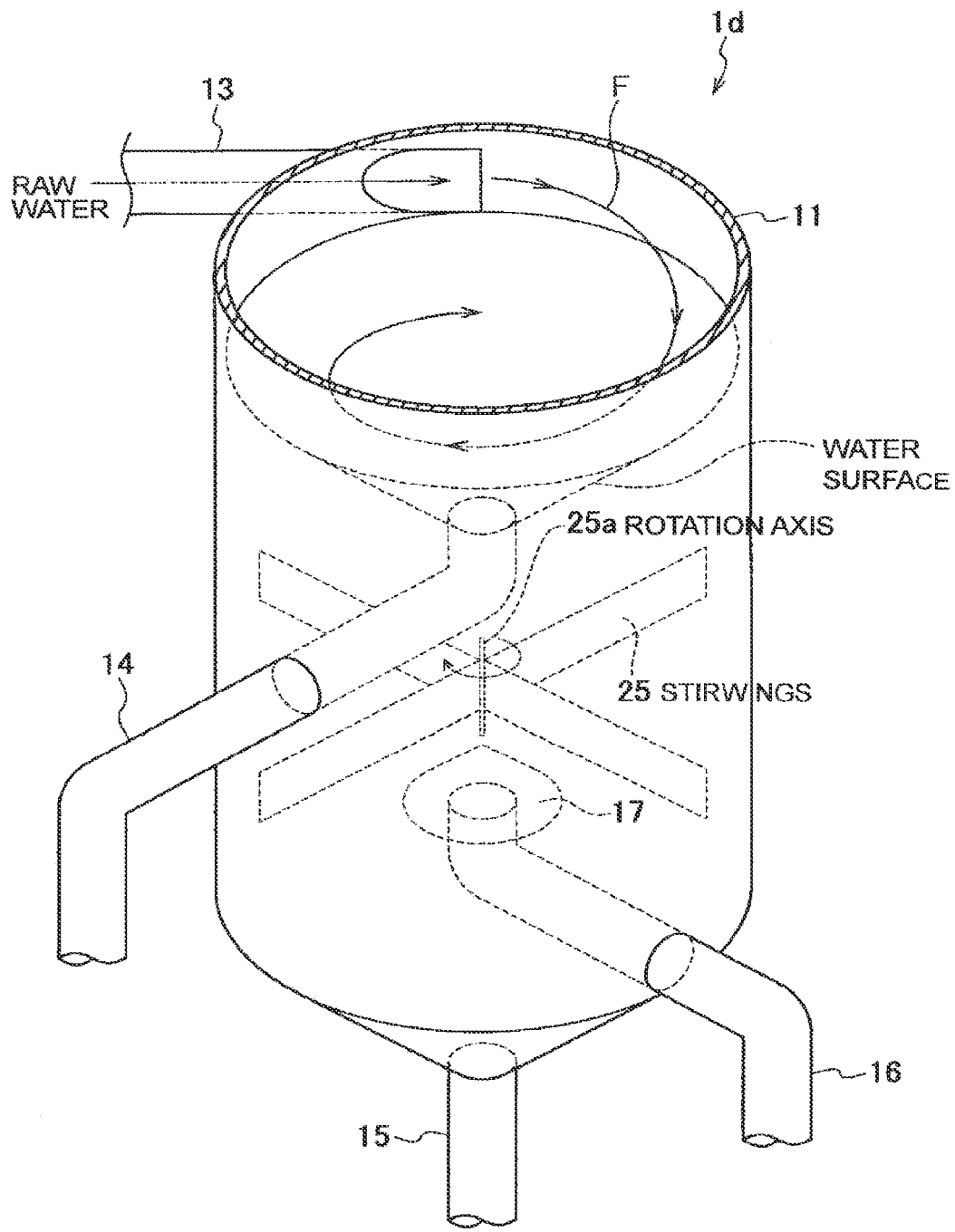
FIG. 8 is a drawing explaining a structure of a solid-liquid separator according to a fourth embodiment.

As shown in FIG. 8, in separation tub 11 of solid-liquid separator 1d, stir wings 21 which rotates in the same direction as flow F of the rotational flow on rotation axis 25a is provided between froth discharge pipe 14 and cover board 17. In solid-liquid separator 1d, the rotational flow is accelerated by rotating of stir wings 25 by control of a motor (not shown).

According to solid-liquid separator 1d of the fourth embodiment, rotation of stir wings 25 can adjust the rotation speed. Therefore, for example, even if the rotation speed falls by supplying fine air bubbles to raw water, rotation of stir wings 25 can adjust the rotation speed at required speed.

In addition, the embodiment in which stir wings 25 are applied to solid-liquid separator 1c which supplies fine air bubbles to raw water shown in FIG. 7 is explained here. Even if stir wings 25 are provided in separation tub 11 of solid-liquid separator 1a which does not supply the fine air bubbles shown in FIG. 1, stir wings 25 can also adjust the rotation speed.

Fifth Embodiment

Solid-liquid separator 1e has acceleration water piping 26 will be explained with reference to FIG. 9A and FIG. 9B. In solid-liquid separator 1e, acceleration water piping 26 is added to solid-liquid separator is shown in FIG. 7. Since other structure is the same as that of solid-liquid separator is shown in FIG. 7, explanation about other structure is omitted.

Figure 9A:
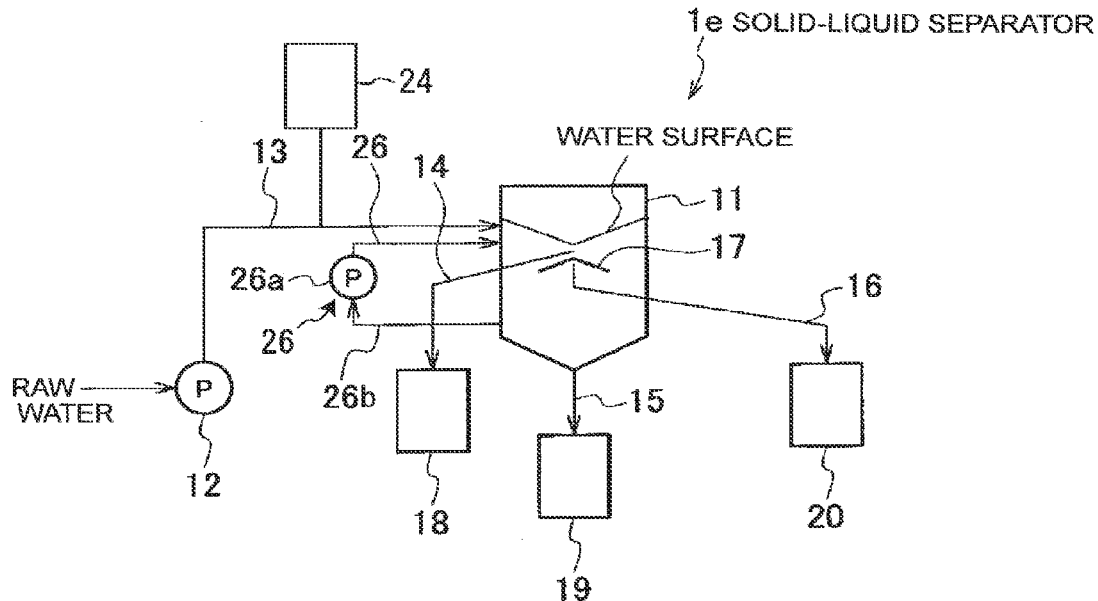
FIG. 9A is a drawing explaining a structure of a solid-liquid separator according to a fifth embodiment.

In solid-liquid separator 1e shown in FIG. 9A, a part of raw water is acquired from separation tub 11 by acceleration water piping 26, and raw water given with a pressure is supplied to separation tub 11 again. Acceleration water piping 26 includes pump 26a and piping 26b, raw water to which the pressure was given by pump 26a is supplied to separation tub 11 by piping 26b, and thereby the rotational flow in separation tub 11 is accelerated.

Figure 9B:
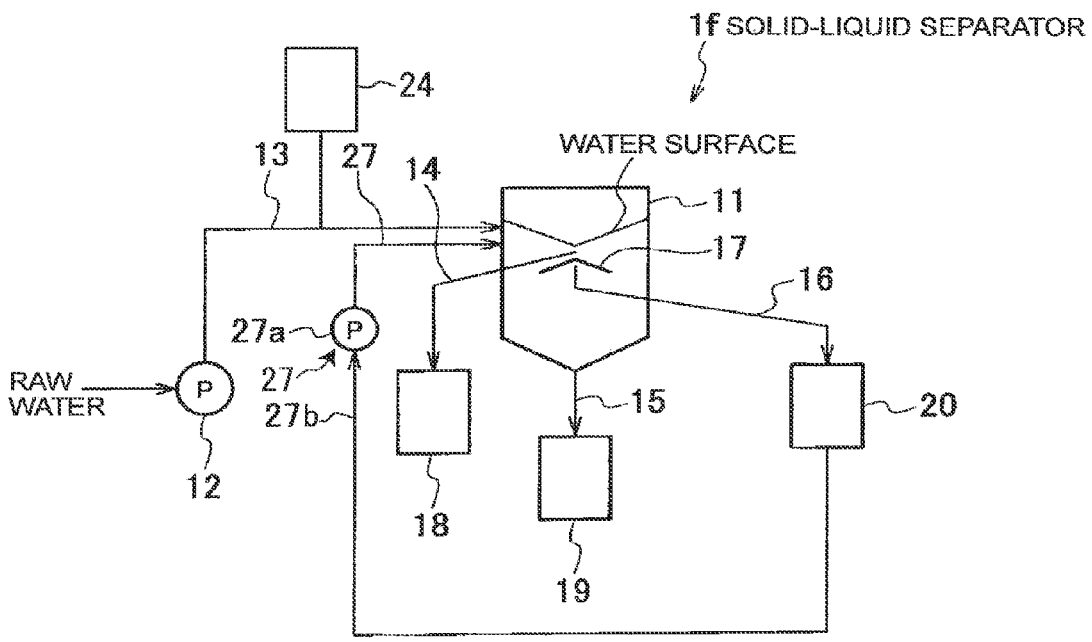
FIG. 9B is a drawing explaining a structure of the solid-liquid separator according to a modification of the fifth embodiment.

In addition, like solid-liquid separator if shown in FIG. 9B, a part of treated water stored in treated water tub 20 is acquired by acceleration water piping 27, and treated water given with the pressure can also be supplied to separation tub 11. Acceleration water piping 27 includes pump 27a which give a pressure to treated water and piping 27b.

As mentioned above, according to the solid-liquid separators 1e and if shown in FIG. 9A and FIG. 9B, the rotation speed can be adjusted by supplying raw water and treated water for acceleration to separation tub 11. Therefore, for example, even if the rotation speed falls by supplying fine air bubbles to raw water, inflow of raw water and treated water which were pressurized with Pumps 26a and 27a can adjust the rotation speed at required speed.

In addition, the embodiment in which raw water and treated water pressurized by pumps 26a and 27a flow into solid-liquid separator is according to the third embodiment shown in FIG. 7 which supplies the fine air bubbles to raw water is explained here. However, even if solid-liquid separator 1a does not supply the fine air bubbles according to the first embodiment shown in FIG. 1, the rotation speed can be adjusted by supplying the pressurized raw water and treated water to separation tub 11.

Sixth Embodiment

Solid-liquid separator 1g according to the sixth embodiment having an adsorbent feeder is explained with reference to FIG. 10. Solid-liquid separator 1g adds adsorbent feeder 28 and line mixer 29 to solid-liquid separator 1a shown in FIG. 1. Since other structure is the same as that of solid-liquid separator 1a explained using FIGS. 1 to 5, explanation about other structure is omitted.

Adsorbent feeder 28 of solid-liquid separator 1g supplies the adsorbent which has a property to absorb suspended solids to raw water which flows into separation tub 11 from inflow pipe 13. The adsorbent is silver or oxidation aluminum ball (diameter of about 1-2 mm) which reduces NOx and powder activated carbon, granular activated carbon etc. which absorbs oil, coloring solids, odor substance, etc. Moreover, in solid-liquid separator 1g, suspended solids M is made to absorb to the adsorbent supplied to raw water, and suspended solids M are collected together with the adsorbent.

Figure 10:
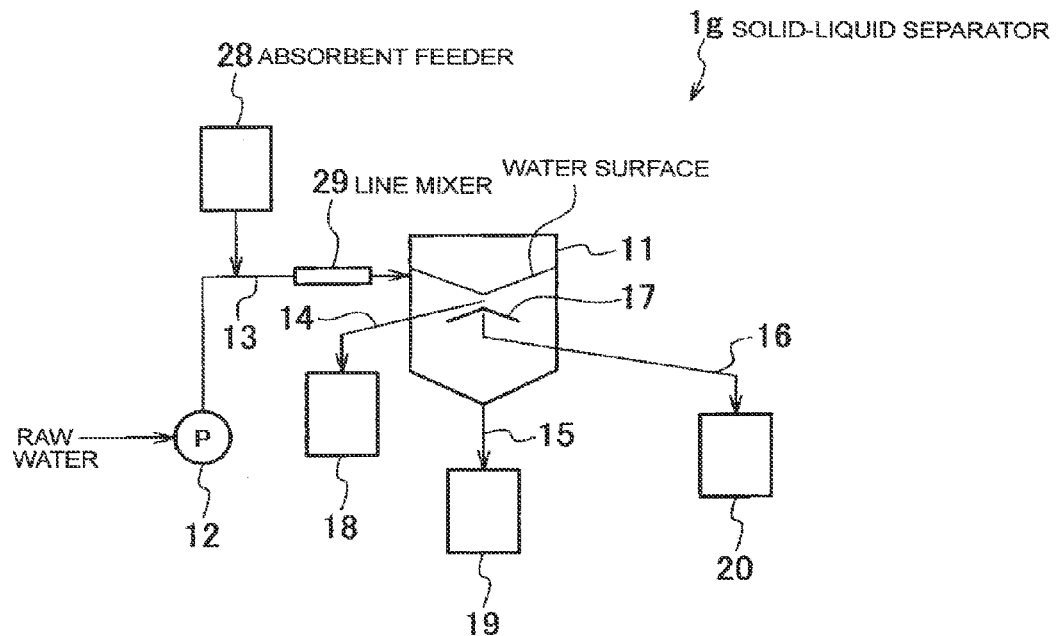
FIG. 10 is a drawing explaining a structure of a solid-liquid separator according to a sixth embodiment.

Moreover, as shown in FIG. 10, incase raw water supplied with the adsorbent flows into separation tub 11, it is desirable to supply raw water to separation tub 11 after agitating the adsorbent in raw water with line mixer 29. Line mixer 29 is an agitator of the line form provided along with inflow pipe 13, and line mixer 29 of the same structure as the line mixer used in the conventional water treatment is used.

As mentioned above, according to solid-liquid separator 1g of the sixth embodiment, by supplying the adsorbent to raw water, the adsorbent absorbs the suspended solids in raw water, and suspended solids can be collected. Therefore, it is possible to shorten the time to collect the suspended solids. Moreover, even if the suspended solids are suspended solids which are difficult to collect and soluble substances, the suspended solids are easily collectable by supplying the adsorbent corresponding the suspended solids. That is, even when suspended solids M dissolve into raw water and suspended solids M do not surface or precipitate within separation tub 11, suspended solids M are collected by making suspended solids M absorb to the adsorbent.

Moreover, absorption of the suspended solids by the adsorbent and collection of suspended solids can be promoted by agitating the adsorbent in raw water with line mixer 29.

In addition, although a case that the adsorbent was supplied to solid-liquid separator 1a of the first embodiment was explained here, the adsorbent can also be supplied to solid-liquid separator 1c which is supplied with the fine air bubbles by the third embodiment.

Seventh Embodiment

Figure 11:
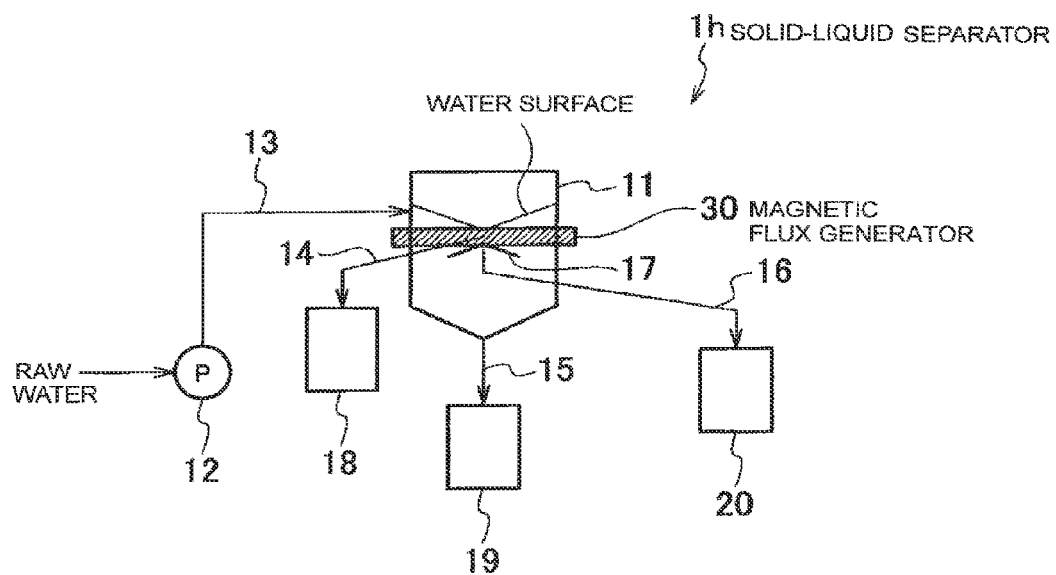
FIG. 11 is a drawing explaining a solid-liquid separator according to a seventh embodiment.

FIG. 11 shows solid-liquid separator 1h according to the seventh embodiment. In solid-liquid separator 1h, magnetic flux generator 30 is added to solid-liquid separator in shown in FIG. 1.

Magnetic flux generator 30 provided with the periphery of separation tub 11 and generates magnetic force toward the inside of separation tub 11. An installation position of magnetic flux generator 30 is moved while magnetic flux generator 30 generates magnetic force at the controlled timing by control of the controller (not shown).

Figure 12:
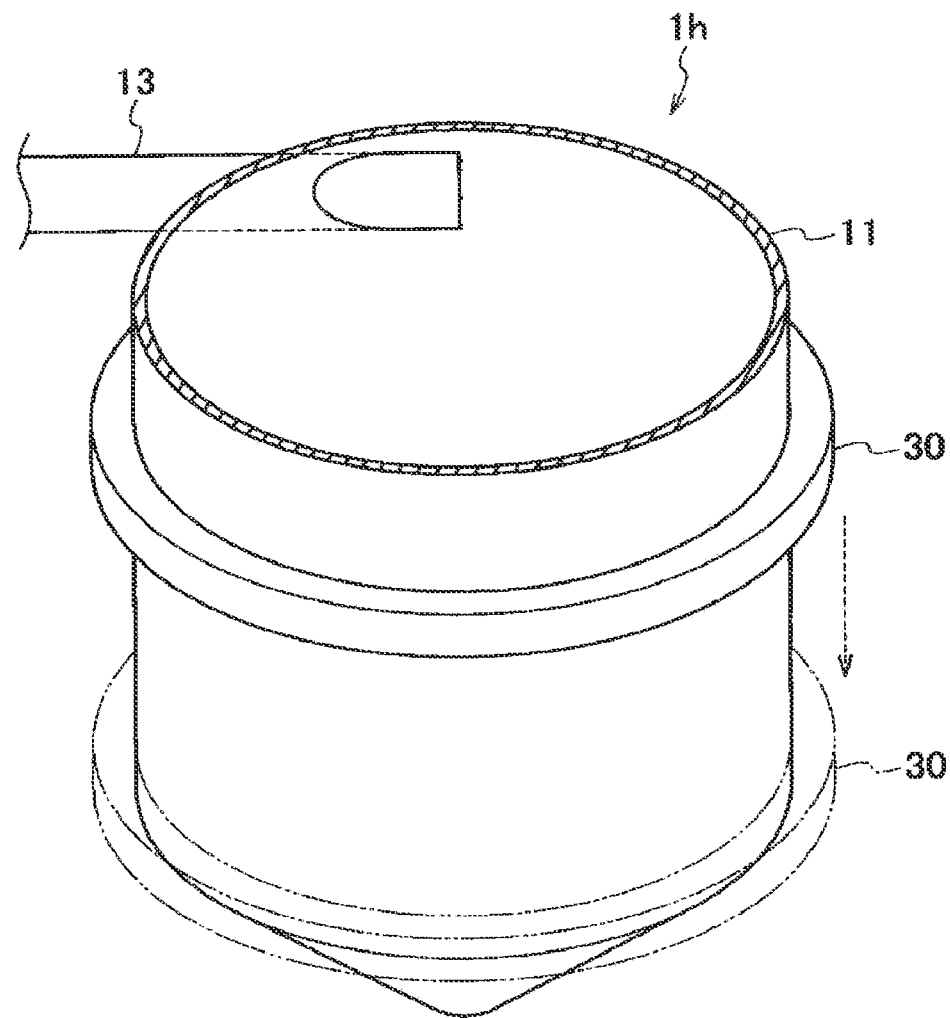
FIG. 12 is a drawing explaining the magnetic flux generator of the solid-liquid separator shown in FIG. 11.

FIG. 12 shows an example which magnetic flux generator 30 is moved in a direction of arrow 30a from an installation position of inflow pipe 13 to an installation position of sludge discharge pipe 15. In addition, magnetic flux generator 30 is moved in the state where magnetic flux generator 30 generates magnetic force. If suspended solids M2 with specific gravity larger than that of water have a property to be drawn to magnetic force, suspended solids M2 will move with moving of magnetic flux generator 30. For this reason, the precipitate of suspended solids M2 can be promoted as compared with the case where magnetic flux generator 30 does not generate magnetic force.

Figure 13:
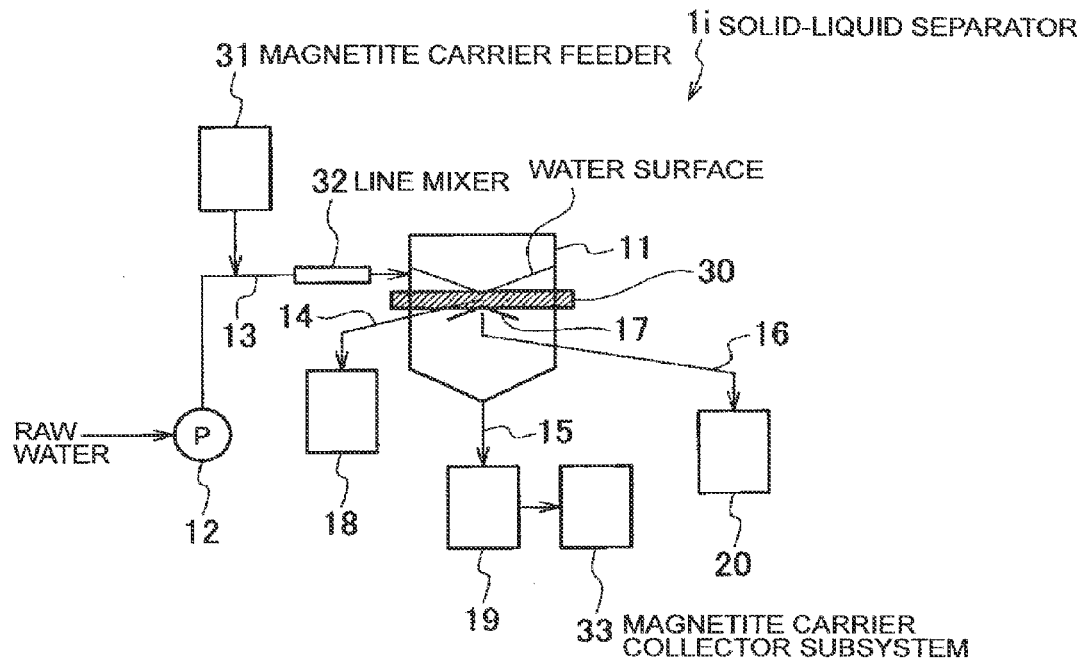
FIG. 13 is a drawing explaining a solid-liquid separator according to the eighth embodiment.

Moreover, if suspended solids M1 with specific gravity smaller than that of water have a property to be drawn to magnetic force, magnetic flux generator 30 is moved in a direction opposite to the direction shown in FIG. 13 by arrow 30a. That is, surfacing of suspended solids M1 can also be promoted by moving magnetic flux generator 30 from the installation position of sludge discharge pipe 15 to an installation position of inflow pipe 13.

That is, when suspended solids M1 have a property to be drawn to magnetic force, magnetic flux generator 30 is controlled so that magnetic force is generated while magnetic flux generator 30 is moving upwards from the bottom, and generating of magnetic force is stopped when magnetic flux generator 30 reaches water surface height. Thus, surfacing and collection of suspended solids M1 are promoted. Moreover, when suspended solids M2 have a property to be drawn to magnetic force, magnetic flux generator 30 is controlled so that when magnetic force is generated while moving downward from the ton and generating of magnetic force is stopped when magnetic flux generator 30 reaches the bottom. Thus, precipitation and collection of suspended solids M2 can be promoted. If both suspended solids M1 and M2 have the properties to be drawn to magnetic force, magnetic flux generator 30 cannot be used. However, when one of the suspended solids M1 and M2 have the property to be drawn to magnetic force, the collection of suspended solids M can be promoted by using magnetic flux generator 30.

in addition, the size or the form of magnetic flux generator 30 are not limited, but it is good that the generated magnetic force should just be transmitted in separation tub 11. Magnetic flux generator 30 can be freely set up in consideration of the form of separation tub 11 and discharge pipes 14 and 15 provide on the periphery of separation tub 11.

As mentioned above, according to solid-liquid separator 1h of the seventh embodiment, when the suspended solids to be drawn to magnetic force is contained in raw water, the suspended solids are collected using magnetic force. Therefore, even if suspended solids are substances with a difficult collection, the suspended solids can be collected in easy and a short time.

Eighth Embodiment

Solid-liquid separator 1i according to the eighth embodiment will be explained with reference to FIG. 13. Solid-liquid separator 1i has a structure which added magnetite carrier feeder 31, line mixer 32 and magnetite carrier collector subsystem 33 to solid-liquid separators 1h with magnetic flux generator 30 shown in FIG. 12. Since other structure is the same as that of solid-liquid separator 1a shown in FIGS. 1 through 5, explanation about other structure is omitted.

Magnetite carrier feeder 31 of solid-liquid separator 1i shown in FIG. 13 supplies the magnetite carrier which has a property to be drawn to magnetic force while absorbing specific suspended solids to raw water which flows into separation tub 11 from inflow pipe 13. The magnetite carrier is an ore of ferrous oxide specifically shown by $Fe_3O_4$, and the ore absorbs fluorine, oil, environmental hormones, etc, by hydrophobising.

At this time, magnetic flux generator 30 is controlled depending on the properties of suspended solids and the magnetite carrier supplied by magnetite carrier feeder 31. For example, in case the magnetite carrier and the adsorbed suspended solids have surfacing property, magnetic flux generator 30 is controlled to generate magnetic force when magnetic flux generator 30 moves upward. Moreover, in case the magnetite carrier and the adsorbed suspended solids have sedimentation property, magnetic flux generator 30 is controlled to generate magnetic force when magnetic flux generator 30 move's downward.

Moreover, in case raw water which was supplied with the magnetite carrier flows into separation tub 11, it is desirable to supply raw water to separation tub 11 after agitating the magnetite carrier in raw water with line mixer 32. That is, the magnetite carrier can be made uniform in raw water by agitating with line mixer 32 after supplying the magnetite carrier. Line mixer 32 is also the same structure as the line mixer used for stirring by the conventional water treatment. In addition, although magnetite carrier feeder 31 supplies the magnetite carrier to raw water which passes inflow pipe 13, magnetite carrier feeder 31 can be provided so as to supply the magnetite carrier to separation tub 11 directly, or supply the magnetite carrier to raw water before passing pump 12.

Furthermore, like solid-liquid separator 1i shown in FIG. 13, if the magnetite carrier is discharged to sludge tub 19 by sludge discharge pipe 15 together with suspended solids M2, the magnetite carrier may be collected by removing suspended solids M2 from the sludge. If the magnetite carriers are collected and are reused by magnetite carrier feeder 31, it is not necessary to prepare the magnetite carrier without any restriction, and a limited magnetite carrier can be used effectively.

As mentioned above, even if the property of the suspended solids contained in raw water can not be drawn to magnetic force, solid-liquid separator 1i according to the eighth embodiment collects suspended solids by supplying the magnetite carrier which can be drawn to magnetic force to raw water. Therefore, even it the suspended solids are difficult to collect and have the property not to be drawn to magnetic force, the suspended solids can be collected easily by making the suspended solids be absorbed to the magnetite carrier.

Moreover, in solid-liquid separator 1i, the magnetite carrier supplied to raw water is made uniform by agitating the magnetite carrier supplied to raw water by line mixer 32. Therefore, the suspended solids in raw water can be absorbed to the magnetite carrier uniformly, and the collection of suspended solids can be promoted. Furthermore, in solid-liquid separator 1i, the magnetite carrier can be effectively used by collecting and reusing the magnetite carrier.

Ninth Embodiment

Solid-liquid separator 1j according to the ninth embodiment will be explained with reference to FIG. 14. Solid-liquid separator 1j has a structure that added flocculant feeder 34 and line mixer 35 to solid-liquid separator 1h shown in FIG. 11. Since other structure is the same as that of solid-liquid separator 1a shown FIGS. 1 through 5, explanation about other structure is omitted.

The flocculant feeder 34 of solid-liquid separator 1j supplies the flocculant which has a property to be drawn to magnetic force to raw water which flows into separation tub 11 from inflow pipe 13. Specifically, the flocculant is poly ferric sulfate, poly ferric chloride ($Fe^{3+}$), etc. Therefore, the floc of suspended solids is generated in separation tub 11 of solid-liquid separator 1j, and the floc of suspended solids is discharged from discharge pipes 14 and 15.

At this time, magnetic flux generator 30 is controlled depending on the property of the suspended solids contained in raw water. For example, when the floc of suspended solids has surfacing property, magnetic flux generator 30 is controlled to generate magnetic force when magnetic flux generator 30 moves upward. Moreover, when the floc of suspended solids has sedimentation property, magnetic flux generator 30 is controlled to generate magnetic force when magnetic flux generator 30 moves downward.

Figure 14:
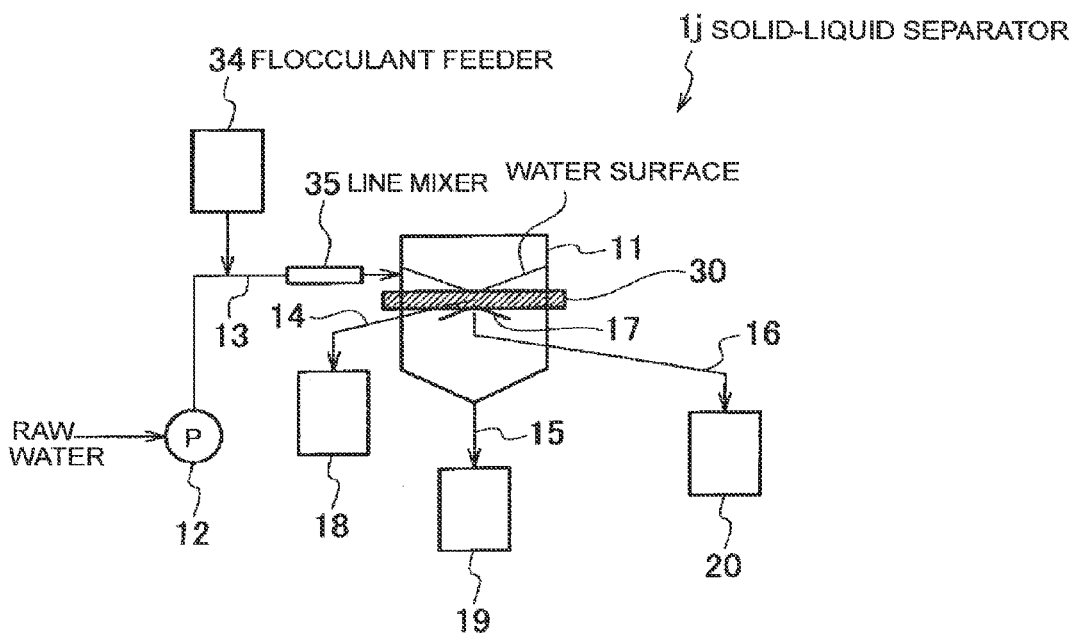
FIG. 14 is a drawing explaining a solid-liquid separator according to a ninth embodiment.

Moreover, in case raw water to which the flocculant was supplied is flowed into separation tub 11, it is desirable to supply raw water in separation tub 11 after agitating the flocculent in raw water with the line mixer 35 like solid-liquid separator 1j shown in FIG. 14. That is, the flocculant can be made uniform in raw water by agitating with line mixer 35, after supplying the floccutent. Line mixer 35 is also the same structure as the line mixer used for stirring by the conventional water treatment. In addition, although flocculant feeder 34 supplies the flocculant to raw water Which passes inflow pipe 13, flocculent feeder 34 can be provided so as to supply the flocculent to separation tub 11 directly, or supply the flocculant to raw water before passing pump 12.

As mentioned above, even when the property of the suspended solids contained in raw water is not drawn to magnetic force, solid-liquid separator 1j according to the ninth embodiment flocculates and collects suspended solids by supplying the flocculent to raw water. Therefore, even if the suspended solids are difficult to collect and have the property not to be drawn to magnetic force, the suspended solids can be collected easily.

Moreover, in solid-liquid separator 1j the flocculant supplied into raw water is made uniform by agitating the flocculant supplied to raw water by line mixer 35. Therefore, in raw water, while formation of the floc of suspended solids is promoted, the collection of suspended solids can be promoted.

Other embodiments or modifications of the present invention will be apparent to those skilled in the art from consideration of the specification and practice of the invention disclosed herein. It is intended that the specification and example embodiments be considered as exemplary only, with a true scope and spirit of the invention being indicated by the following.

What is claimed is:

1. A solid-liquid separator for separating raw water containing suspended solids into suspended solids and treated water, the solid-liquid separator comprising:
   a separation tub having an outer wall and a bottom;
   an inflow pipe having an outlet, the outlet of the inflow pipe being positioned outside of the center of the separation tub to rotate raw water which flowed in the separation tub from the outlet of the inflow pipe to the separation tub;
   a froth discharge pipe having an inlet, the inlet of the froth discharge pipe being positioned near a surface of raw water in the separation tub to discharge the suspended solids surfaced in the separation tub;

a treated water discharge pipe having an inlet, the inlet of treated water discharge pipe being positioned in the separation tub to discharge treated water in which the suspended solids were removed from raw water;

a cover board of umbrella shape provided between the inlet of the froth discharge pipe and the inlet of treated water discharge pipe;

a sludge discharge pipe having an inlet, the inlet of the sludge discharge pipe being positioned at the bottom of the separation tub to discharge the suspended solids precipitated in the separation tub;

a fine air bubbles generator generating fine air bubbles of size adhering to the suspended solids with specific gravity smaller than that of water, and supplying the fine air bubbles to raw water, and the fine air bubbles include mixed gas of air and at least one of carbon dioxide or ozone;

a pump for giving pressure to a part of raw water acquired from the separation tub for accelerating a rotation of raw water in the separation tub; and a pipe for supplying raw water pressured by the pump to the separation tub.

* * * * *